(12) United States Patent
Godlewski

(10) Patent No.: US 6,421,354 B1
(45) Date of Patent: Jul. 16, 2002

(54) SYSTEM AND METHOD FOR RETRIEVAL OF DATA FROM REMOTE SENSORS USING MULTIPLE COMMUNICATION CHANNELS

(75) Inventor: Ronald W. Godlewski, Collegeville, PA (US)

(73) Assignee: Phoenix DataComm, Inc., King of Prussia, PA (US)

( * ) Notice: Subject to any disclaimer, the term of this patent is extended or adjusted under 35 U.S.C. 154(b) by 0 days.

(21) Appl. No.: 09/376,520

(22) Filed: Aug. 18, 1999

(51) Int. Cl.[7] .......................... H04J 16/22; G08C 19/16
(52) U.S. Cl. ................... 370/466; 340/870.01; 702/127
(58) Field of Search ................................ 370/464, 465, 370/466, 474, 349; 340/870.01, 870.07, 500, 501, 3.1, 3.9, 870.04; 710/105; 455/403, 404, 418–420; 235/375; 702/1, 127, 188

(56) References Cited

U.S. PATENT DOCUMENTS

| | | | |
|---|---|---|---|
| 4,188,618 A | 2/1980 | Weisbart ................ 340/870.16 |
| 4,258,421 A | 3/1981 | Juhasz et al. .................. 701/35 |
| 4,561,057 A | 12/1985 | Haley, Jr. et al. ............ 701/117 |
| 4,688,026 A | 8/1987 | Scribner et al. .............. 235/385 |
| 4,688,244 A | 8/1987 | Hannon et al. ................ 377/58 |
| 4,745,564 A | 5/1988 | Tennes et al. .............. 702/141 |
| 4,750,197 A | 6/1988 | Denekamp et al. ......... 455/404 |
| 4,825,457 A | 4/1989 | Lebowitz ...................... 379/40 |
| 4,884,208 A | 11/1989 | Marinelli et al. ........... 701/300 |
| 4,949,299 A | * 8/1990 | Pickett ....................... 710/105 |
| 5,014,206 A | 5/1991 | Scribner et al. ............. 701/207 |
| 5,125,021 A | 6/1992 | Lebowitz ...................... 379/40 |
| 5,129,605 A | 7/1992 | Burns et al. .................... 246/5 |
| 5,146,486 A | 9/1992 | Lebowitz ...................... 379/40 |
| 5,327,478 A | 7/1994 | Lebowitz ...................... 379/40 |
| 5,335,186 A | * 8/1994 | Tarrant ....................... 702/127 |
| 5,454,024 A | 9/1995 | Lebowitz ...................... 379/40 |
| 5,475,597 A | 12/1995 | Buck ........................... 455/456 |
| 5,490,079 A | 2/1996 | Sharpe et al. ............... 364/467 |
| 5,719,771 A | 2/1998 | Buck et al. .................. 455/456 |
| 5,745,849 A | * 4/1998 | Britton ........................ 455/404 |
| 5,955,942 A | 9/1999 | Slifkin et al. ............... 340/436 |
| 5,983,198 A | * 11/1999 | Mowery et al. .............. 705/22 |
| 6,023,223 A | * 2/2000 | Baxter, Jr. .................. 340/531 |
| 6,075,451 A | 6/2000 | Lebowitz et al. ....... 340/825.06 |

* cited by examiner

Primary Examiner—Kwang Bin Yao
Assistant Examiner—Kevin C Harper
(74) Attorney, Agent, or Firm—Reed Smith L.L.P.

(57) ABSTRACT

A system and method for providing data acquisition services for a customer from a sensor located in a remote location. A communicator co-located with at least one sensor monitors the sensor and reports data to a network operations center according to data monitoring instructions. The data is reported via a transport path, which can be cellular, satellite cellular, pager, or a public phone path. The network operations center reports data to the customer or to another designated recipient through a dissemination channel. The customer is able to provide revised data monitoring instructions to the network operations center via the dissemination channel. The network operations center forwards the revised data monitoring instruction to the communicator.

1 Claim, 6 Drawing Sheets

US 6,421,354 B1

SYSTEM AND METHOD FOR RETRIEVAL OF DATA FROM REMOTE SENSORS USING MULTIPLE COMMUNICATION CHANNELS

FIELD OF THE INVENTION

The present invention relates generally to the retrieval and dissemination of data from remote sensors and more particularly to the retrieval and dissemination of data from remote sensors using multiple communication channels,

BACKGROUND

Many businesses need to monitor and control industrial processes remotely, to track mobile assets, or to gather other data remotely over an extended period of time. Many systems are available for remote data monitoring; however, these systems typically have limited geographical coverage often due to a reliance on a single mode of communication that is not available throughout the United States. Many of these systems are also immobile and expensive, consume large amounts of power, and offer limited message capacity. Many systems are capable of monitoring only very limited types of data; hence, companies must purchase and use multiple systems if the data that they need to monitor does not match exactly the capabilities of any prior art system.

Many companies do not use the prior art systems to monitor their operations either due to expense or due to the need to utilize multiple systems to cover all of their sites, which limits the usefulness of the gathered data. If a single system capable of delivering data from the entire United States (or abroad) in a format chosen by the customer with an easily ascertainable total cost were available, many more companies would choose to make use of remote monitoring technology.

It is therefore an object of the present invention to provide a system and a method for transmitting data from remote sensors to a central location using a plurality of communications media in a fashion that is transparent to the customer.

It is a further object of the present invention to provide a system and method for transmitting data from remote sensors to a central location that can be used with a variety of remote sensors capable of detecting a variety of different types of data.

SUMMARY OF INVENTION

The present invention is directed to a system and method for communicating data from a sensor located in a remote location. A processor, a sensor interface, a power module, including a power supply, and a transport interface are provided. The sensor interface receives data from a sensor in a first format. The sensor interface converts the data into a common format if the data is not already in the common format. The transport interface receives the formatted data from the sensor interface and transmits the data to a transport system.

In another aspect, the present invention is directed to a system and method for receiving data at a network operations center. A transport interface, a message and command handler, a message storage module, comprising a memory, and a dissemination system are provided. The transport interface receives data from a transport system in one of a plurality of predetermined data formats. The transport interface converts the data into a common format if the data is not already in the common format. The message and command handler receives the formatted data from the transport interface.

In another aspect, the present invention is directed to a method for gathering data, wherein data are automatically measured with a remote sensor, the data are transmitted from the sensor to a central location, predetermined criteria are applied to the data, and the data are transmitted to a customer if the predetermined criteria are met.

DETAILED DESCRIPTION OF THE INVENTION

Figure 1:
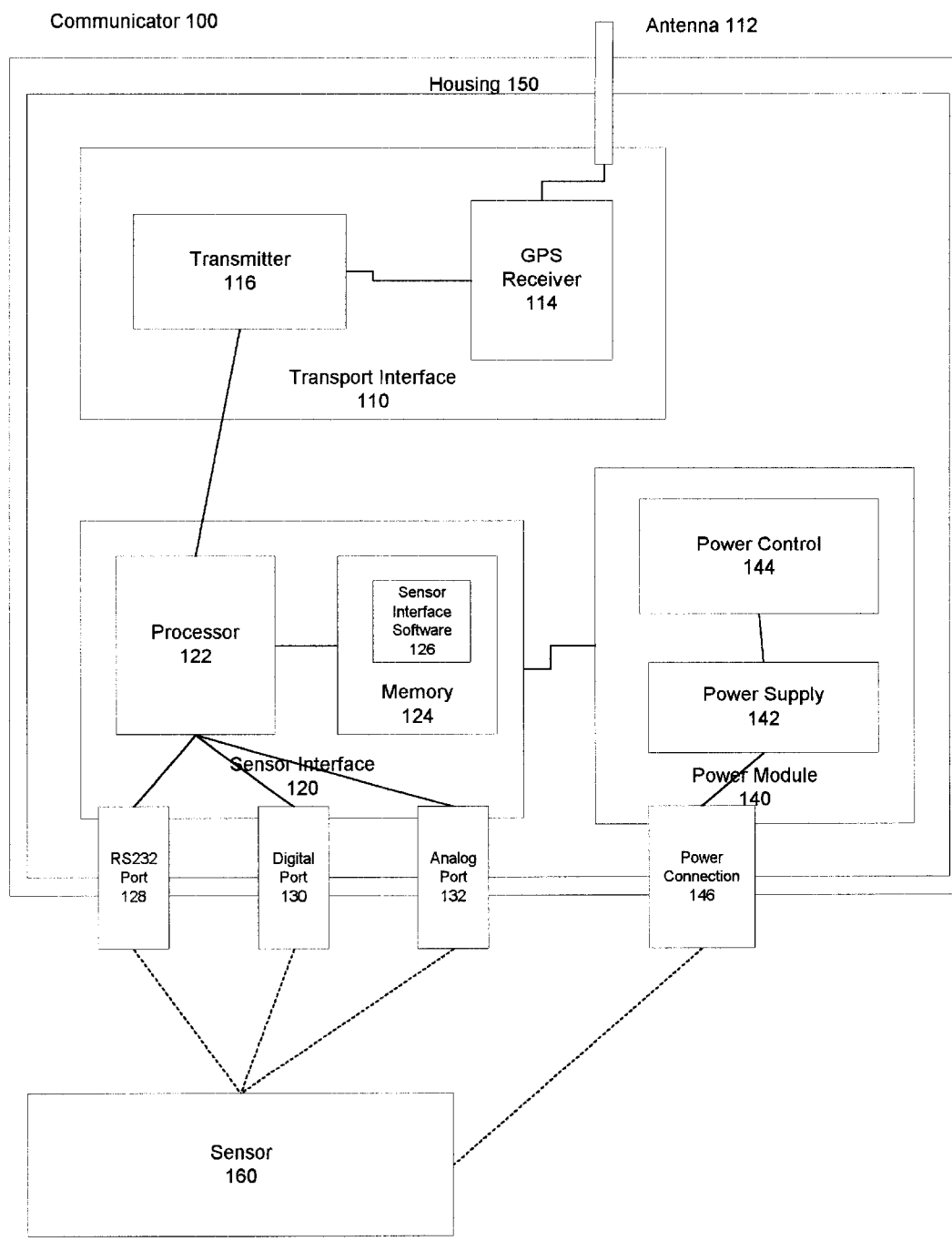
FIG. 1 is a block diagram of a communicator in accordance with a first preferred embodiment of the present invention.

The following definitions are provided to aid in understanding the claims of the present application:

Available. A transport subsystem is considered available at a particular time with respect to a particular intended transmission if a message can be transmitted over it at that time from the applicable point of origination to the applicable destination with an acceptable degree of quality. A transport system is typically unavailable either because coverage is unavailable in a relevant area or because the transport subsystem has no remaining capacity at the time. In some embodiments of the present invention, capacity will be determined to be lacking if a transport subsystem is unable to fulfill a single transport request. In other embodiments, however, particularly in embodiments where it is not essential that data be delivered immediately, capacity may be considered to be lacking only if a transport subsystem is unable to fulfill a series of requests over a period of minutes, hours, or even days.

The most available transport subsystem is the available transport subsystem that best satisfies an algorithm used in the particular embodiment to select the most available transport subsystem. In a first preferred embodiment, this algorithm selects the most available based on three criteria: lowest cost, best service (which may be measured based on highest received signal strength, highest signal to noise ratio, and similar measures of signal quality), and transport capacity, with lowest cost being the most important criterion and transport capacity being the least important criterion. In other embodiments, however, the order of the criteria, and the identity of the criteria, may differ, based on customer requirements.

Communicator. A device that transmits data between a network operations center and a remote sensor. A communicator can typically be connected to multiple different types of sensors, but, in certain embodiments, it may instead be combined into a single housing with a particular remote sensor. In certain preferred embodiments, a communicator is able to transmit data to a network operations center using several alternate communications channels, such as cellular, satellite, and paging channels, but in other embodiments, a particular communicator is able to use only one such channel.

GPS. The Global Positioning System, operated by the United States Department of Defense, that is used to determine the current position (and speed) of a GPS receiver in contact with it and that can also be used to determine the current time.

Interface. Hardware, software, or a combination of hardware and software that enables two or more systems, or two or more elements of one system, to exchange data.

Message. Any collection of data that is transmitted, including an ordinary telephone call, a wireless telephone call, a page, a Short Message Service message, or an e-mail message.

Network Operations Center. A central location to which data gathered by multiple remote sensors are transmitted and from which such data, or data gathered from or relating to such data, are disseminated to others.

Port. A channel through which data may flow between a processor and an input or output device. For purposes of the present invention, the term port is intended to encompass, without limitation, the connector and associated cables through which data flow from an external device to a processor, any associated devices necessary to convert data into a form usable by the processor, such as an analog to digital converter, and any other associated devices used in connection with the flow of data within the particular channel only.

RS-232. A serial communications standard adopted by the Electrical Industries Association defining line and signal characteristics. The term RS-232 is intended to include the RS232-C standard as well as earlier and later versions of the RS232 standard.

Sensor. Any device that measures data. With respect to the present invention, a sensor may be combined into a single housing with a communicator or may be a separate device capable of being attached or connected to a communicator. A communicator that includes a GPS receiver may itself function as a sensor (with respect to geographical coordinates).

Sleep Mode. A temporary state of suspension. In the context of the present invention, it is a temporary state of suspension in which processing activity is limited to activity necessary to determine whether to terminate sleep mode and return to normal operation.

SMS. The Short Message Service as defined under the Global System for Mobile Communications (GSM) standard in effect at the time of filing of the present application, or any similar message service defined under any later version of the GSM standard or any other standard. The SMS standard currently provides, inter alia, for send and receive capability for short messages of 140 characters in 8-bit format, message concatenation, and message delivery confirmation.

Transmit. With respect to the present invention, data are considered to be transmitted by wireless communication methods when the data are sent, whether or not the data are received. With respect to communications over a network, including the Internet, data are considered to be transmitted if the data are (i) sent directly to the intended recipient, (ii) sent to an intermediate entity or device for forwarding to the intended recipient, or (iii) made available for viewing by the intended recipient over the network, in any case regardless of whether the data are ever received or viewed by the intended recipient. Thus, the dispatch of an e-mail message to an Internet server for delivery to the recipient's e-mail server for eventual viewing by the recipient is considered transmission over the Internet even if the dispatching computer, the Internet server, and the e-mail server are the same computer. Similarly, making data available for inspection by the intended recipient on a World Wide Web server is considered to be transmission over the Internet even if the computer from which the data are being transmitted is the server from which the data are being made available over the World Wide Web and even if the recipient connects to the World Wide Web from the same computer.

Transport System. A transport system is comprised of one or more transport subsystems, which may or may not have overlapping availability, geographically or temporally.

Transport Subsystem. A system for transporting messages from a sender to a recipient, such as from a communicator to a network operations center. Examples of transport subsystems are cellular telephone systems, paging systems, and satellite communications systems.

Referring to FIG. 1, a communicator 100 includes a transport interface 110, which is connected to a sensor interface 120 and a power module 140, which are also connected to each other. In the preferred embodiment, the sensor interface, transport interface, and power module are disposed within a housing 150, and the sensor interface and power module are connected to an external sensor 160. However, in other embodiments, the sensor may be integrated into the communicator. Moreover, the housing may be omitted.

In the preferred embodiment, the sensor interface includes a processor 122, which may be a microprocessor, a memory 124, which is connected to or located in the processor, and three ports, an RS-232 port 128, a digital input/output port 130, and an analog input/output port 132. In other embodiments, a greater or lesser number of ports, of possibly differing formats, may be used. Furthermore, although the preferred embodiment is, with limited exceptions, designed to utilize only one port at a time, whichever is most suitable to the external sensor connected to the communicator, in other embodiments multiple sensors may simultaneously be connected to multiple ports. The use of multiple sensors might be desirable in order to take measurements of differing nature at the same location (such as air and noise pollution) or for fault tolerance purposes. Of course, in an embodiment featuring an integrated sensor, the ports may be omitted altogether. Moreover, in embodiments in which processing of input and output is unnecessary (such as in the integrated sensor embodiment), the processor may be omitted from the sensor interface, although a processor would then be necessary elsewhere within the communicator.

Within memory 124 is located sensor interface software 126. The sensor interface software automatically detects the port from which data have arrived. Based on the port from which the data have arrived, the sensor interface software determines the current format of the data. For example, if the data arrives in a message received through an RS-232 port, the sensor interface software might check the value of a field in the message header to determine the data format. If the data arrives through an analog or digital port, the sensor may be able to determine the format of the data if the port type was stored (using an RS-232 or similar port) in the communicator at the time of installation of the sensor. Thus, the sensor might be instructed to treat all data received through the digital port as humidity data in a certain format or it might be instructed to treat all data received through the analog port as humidity data in a certain format if the digital port receives a high input (such as constantly receiving values representing a binary one) or as temperature data in a certain format if the digital port receives a low input (such as constantly receiving values representing a binary zero). Alternatively, the sensor may only identify data received through a digital port as raw digital values and data received through an analog port as raw analog data (converted to a stepped digital value as described below in connection with FIG. 6). The sensor interface software then converts the data to a common format if the data's current format is not the common format. Depending on the degree to which the data has been identified, the underlying data may be converted to a standard format at this time. In any event, any necessary header fields are created in a common format.

Power module 140 includes at least a power supply 142. The power supply may be lithium or other batteries that preferably allow the communicator and an attached sensor to function unattended for a substantial period of time, such as a year. In a first preferred embodiment, the power supply provides a power output comparable to 6 D cell batteries.

In the preferred embodiment, the power module also includes power control 144 and power connection 146. The power control may be implemented either completely in software, which may reside in memory 124, or partly in software and partly in hardware. In the preferred embodiment, whenever more than a predetermined amount of time has passed since the communicator has received data from either sensor 150 or from a network operations center, as described below, the communicator enters a sleep mode in order to conserve power, provided that it does not need to process or transmit any data received from either the sensor or the network operations center. The communicator then ceases all processing except that necessary to receive data from either the sensor or the network operations center and to periodically (such as once every several seconds) check whether any data has been received. When data is received from either source, the communicator exits sleep mode. The specific trigger awakening the communicator from sleep mode after the receipt of a message may be either a hardware or a software interrupt. In the case of a software interrupt, it is necessary for the processor to check periodically for the interrupt.

In the preferred embodiment, the power module also includes a connection 146 to external sensor 160 that provides power to the sensor. In the event that the sensor has its own power source, use of this connection may not be necessary. Also, if the sensor has unduly large power requirements, the power module may be insufficient for this purpose and an additional power source may be necessary. Alternatively, a more powerful power supply could be substituted in order to power such a sensor.

The sensor may be any commercially available or custom built sensor that can send data to the communicator through any of the communicator's ports in a format that can be interpreted by the sensor interface, as discussed above. Such a sensor might be used to measure, inter alia, traffic patterns, sound, temperature, humidity, pressure, weight, force, any form of electromagnetic radiation, the usage of electricity, gas, oil, water, or telecommunications resources, geographic location, speed, current, or the purity or composition of substances such as water. Sensors capable of measuring many of such types of data are commercially available. For example, as of the filing date of the present application, several such sensors were available from the Veriteq company of Richmond, British Columbia, Canada, namely a temperature sensor, (the Spectrum 1000 Temperature Logger), a combination temperature, humidity, and dewpoint sensor (the Spectrum 2000 Temperature, Humidity and Dewpoint Logger), and a combination electric current and temperature sensor (the Spectrum 3300 Electric Current and Temperature Logger).

Transport interface 110 serves to prepare and transmit the data received from the sensor interface to the transport system described below. The transport interface includes at least an antenna 112, a receiver 114, and a transmitter 116. In a first preferred embodiment, the receiver is a GPS receiver, so as to allow the communicator to determine its position and the current time. In different embodiments, multiple antennae, receivers, and transmitters may be present, and the receiver and the transmitter may be replaced with a transceiver. Other hardware components and software may be necessary to prepare the data for transmission, depending on the requirements of the transport subsystem used in each case.

The housing 150 may be constructed of a plastic-derivative material for use in non-hostile environments. In environments posing more of a risk of damage to the communicator, a more durable housing may be necessary. Such a housing might be constructed of stainless steel, aluminum, fiberglass, or fiberglass reinforced polyester. Such a more durable housing might be desirable for a communicator located at a pipeline or in a railcar, for example. In the preferred embodiment, the housing is approximately four inches in width by six inches in length by two inches in depth. The size of the housing, however, depends on the size of the circuit boards, batteries, connectors, and mounting used in each particular embodiment of the present invention.

Figure 2:
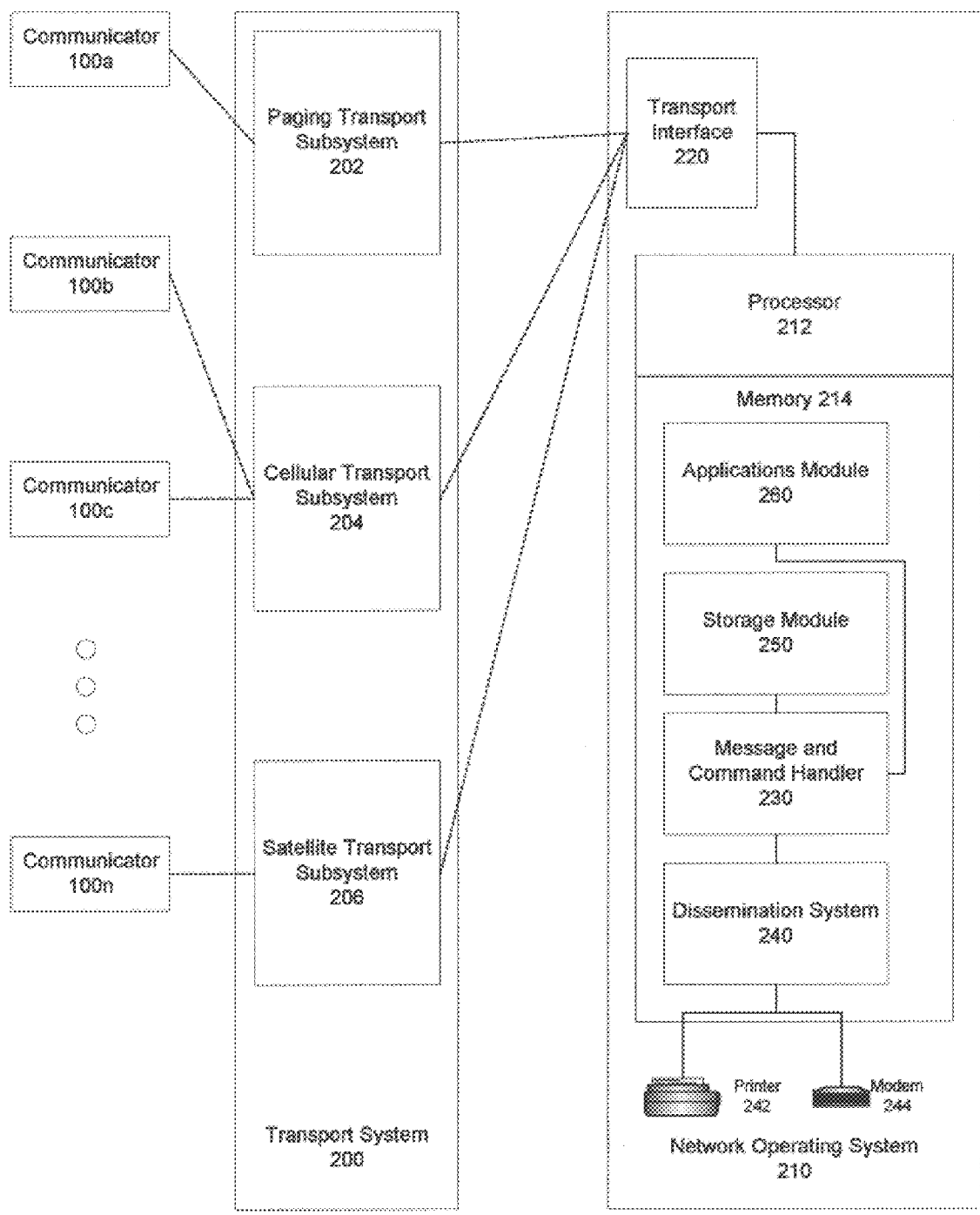
FIG. 2 is a block diagram of a remote data retrieval and dissemination system in accordance with a first preferred embodiment of the present invention.

Referring to FIG. 2, a plurality of communicators 100a through 100n exchange data with a network operations center 210 by sending messages over a transport system 200. Communicators 100a through 100n may be identical to each other or may vary in many respects. The sensors to which the communicators are attached may be of different designs, as discussed below, and may sense different types of data, as described above, in different geographic locations on different measurement and communication schedules for different customers. The sensors may also use different transport subsystems for communicating with a single network operations center. In addition, although only one network operations center is shown in FIG. 2, more than one network operations center may be employed and such network operations centers may be kept in synchronization through the use of replication technology, which technology is well known in the database arts, or other means.

In a first preferred embodiment, the transport system is composed of a paging subsystem 202, a cellular subsystem 204, and a satellite subsystem 206. In other embodiments, a greater or lesser number of transport subsystems may be employed, utilizing the same or other wireless or non-wireless transport methods. Each communicator uses the transport subsystem most available to it at the time to communicate with the network operations center. The most available transport subsystem for a particular communicator may always be the same transport subsystem if the communicator is always present in a location covered by only one transport subsystem with an acceptable degree of quality.

Network operations center 210 includes processor 212 and memory 214. The processor may be a microprocessor such as any member of the Intel Pentium and Sun Sparc families of microprocessors. The memory may be temporary memory, such as random access memory, or permanent storage, such as a hard drive, but is preferably a combination of both. In memory 214, in the preferred embodiments, are loaded message and command handler 230, dissemination system 240, storage module 250, applications module 260, and the software components of transport interface 220. In different embodiments, transport interface 220, message and command handler 230, dissemination system 240, storage module 250, and applications module 260 may have dedicated processors and memories, as well as other components. The use of multiple processors and memories may be desirable to enhance performance or to reduce risk through hardware redundancy.

Transport interface 220 includes an interface component for each transport subsystem that converts each message received by the network operations center into a common format and that converts each message sent by the network operations center over the transport system into a format appropriate for the particular transport subsystem used.

Message and command handler 230 receives messages from the communicators after processing by transport interface 220. The message and command handler may dispatch these messages to storage module 250 for storage, may dispatch these messages to dissemination system 240 for delivery to customers, may compile data from multiple related messages for later storage or dissemination to customers, or may perform some combination of these actions, depending on predetermined criteria chosen by customers. The message and command handler may also generate messages for delivery through the dissemination system informing customers of the failure to receive expected messages from communicators. For example, the message and command handler may, with respect to messages received from a series of communicators attached to temperature sensors, (i) dispatch each temperature reading message to the storage module, (ii) in the case of each temperature reading message in which the temperature read does not fall within a predetermined range, dispatch such temperature reading message to the dissemination system, and (iii) generate and dispatch to the dissemination system a message identifying each temperature sensor from which no temperature message has been received within a predetermined period of time.

Optionally, the message and command handler may also send messages to the communicators. Such messages could include acknowledgements of received messages, requests for transmission or retransmission of expected messages that were not received or that appear to have become corrupted, and instructions for revising sensor reading and message dispatch schedules. Moreover, the message and command handler may broadcast a single message to a plurality of communicators at one time. For example, the message and command handler might broadcast a message to all of a particular customer's communicators, or all of that customer's communicators attached to temperature sensors, or all of that customer's communicators located in a particular geographic region.

The message and command handler also receives messages from customers through the dissemination system. Such messages may include requests for transmission or retransmission of expected messages that have not arrived or appear to have become corrupted, requests for data stored in storage module 250 or requests for data derived from such data, and optionally, instructions to revise sensor reading and message dispatch schedules.

In the preferred embodiments of the present invention, message delivery is guaranteed. The customer receives all expected messages even if the desired content of the messages cannot be supplied. For example, if the customer has arranged to receive a message every hour identifying the temperature sensors, if any, of a series of temperature sensors that have measured temperatures falling outside of a predetermined range, the customer will receive a message every hour identifying not only the sensors that have reported temperatures falling outside of the predetermined range, but also the sensors, if any, that have failed to report a temperature.

Figure 3:
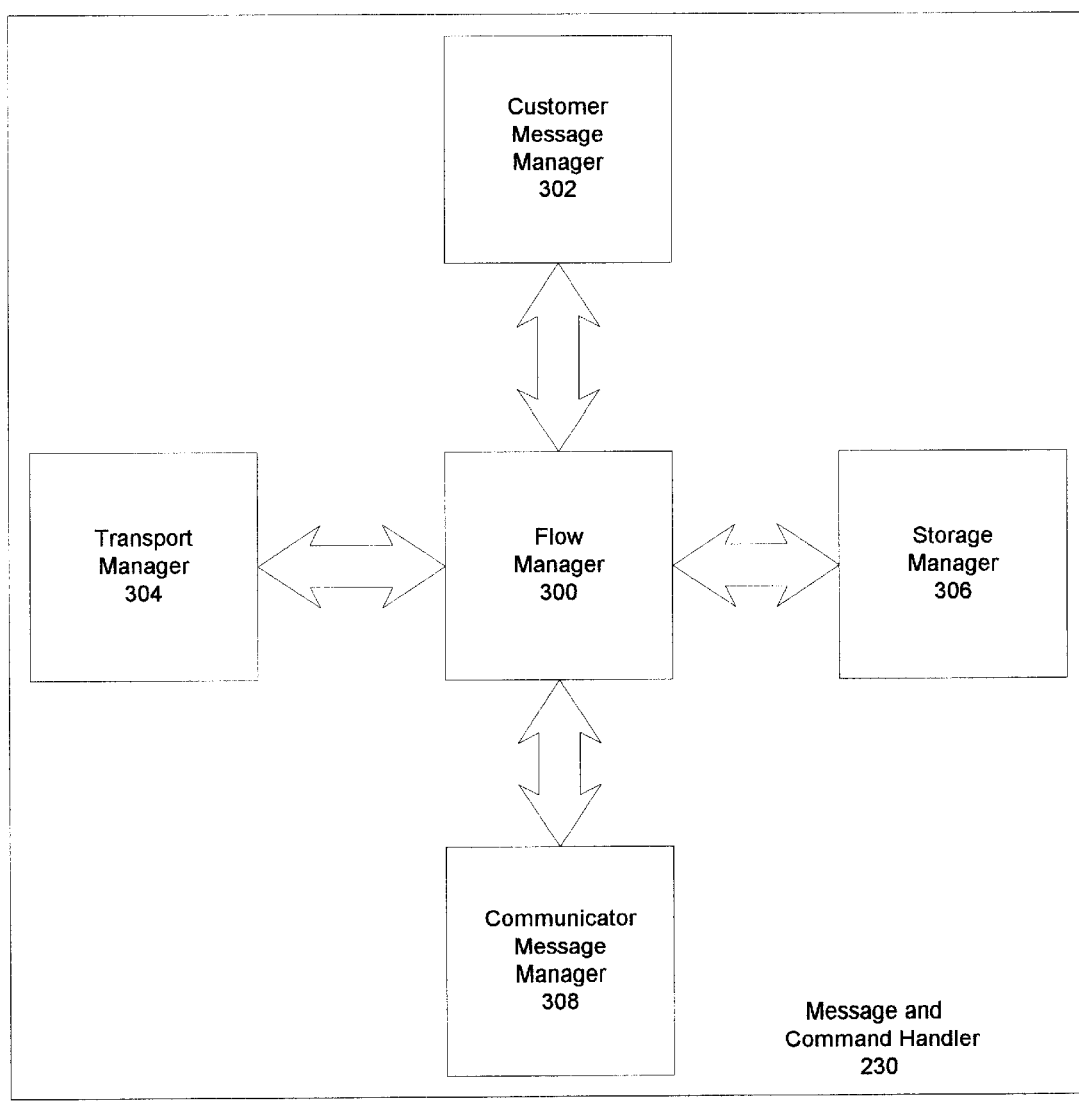
FIG. 3 is a block diagram of several sub-components of one component of a remote data retrieval and dissemination system in accordance with a first preferred embodiment of the present invention.

Referring to FIG. 3, in a first preferred embodiment, message and command handler 230 includes flow manager 300, customer message handler 302, transport manager 304, storage manager 306, and communicator message manager 308. Flow manager 300 manages the flow of data between customers, communicators, and other system elements. Such management includes routing messages to customer message handler 302, transport manager 304, storage manager 306, and communicator message manager 308 as is appropriate, as well as coordinating acknowledgements between the various system elements to ensure that any failure to deliver a message results in the transmitting element being alerted to the failure. The flow manager also coordinates the recording of message detail records, including such information as message type, message size, and time stamps, for billing purposes.

Customer message manager 302 processes messages received from customers. Such messages may relate, as is discussed below, to customer requests for stored data from the network operations center, in which case the network message center must request the retrieval of such data and its subsequent transmission to the customer, or to customer requests for revised sensor measurement or transmission schedules, in which case the customer message manager must request the transmission of an appropriate message to the appropriate sensor or sensors.

Transport manager 304 is responsible for selecting the appropriate transport subsystem (and the corresponding transport interface component) for all messages to be transmitted from the network operations center to communicators. In the preferred embodiments, the transport manager uses the same criteria for selecting a transport subsystem for transmissions to communicators as the communicators do for transmissions to the network operations center.

Storage manager 306 is responsible for dispatching to storage module 250 all messages and other data that is required to be stored. Depending on customer requirements, all data retrieved from all communicators relating to that customer may be stored or only summary data an d certain data meeting predetermined criteria. The storage manager enforces any such rules.

Communicator message manager 308 is responsible for processing all messages received from communicators. Such processing may include extracting sensor measurements from such messages, determining based on predetermined rules what data should be transmitted to customers (e.g., all data, summary data, or data falling within predefined parameters), and formatting the extracted data for storage or transmission or both.

In other embodiments of the present invention, the functionality of the message and command handler may be divided among a greater or lesser number of components, in a different manner among the components, or among several different modules, some or all of which may be external to the message and command handler.

Returning to FIG. 2, dissemination system 240 includes or is connected to one or more mechanisms for delivering or preparing for delivery data to customers. Such mechanisms may include modem 244 and printer 242. Data are typically delivered by transmitting the data to a World Wide Web server for subsequent viewing by the customer but can also be delivered by e-mail, facsimile, automated voice message, or hard copy sent by mail or otherwise. In a first preferred embodiment, the customer may select the means by which he will be notified; however, in other embodiments, only certain means of receiving data may be available and not all means may be available to all customers. Moreover, customers may be allowed to use several means of receiving data, such as e-mail notification of the receipt of certain data (such as sensor readings falling outside of expected parameters) and World Wide Web access to other data (such as all of the sensor readings). The dissemination system may also receive data from customers in certain embodiments, such as requests for the retransmission of data, the transmission of additional data (such as stored detail data), and the alteration of data transmission methods and schedules and sensor reading schedules.

Furthermore, data may be sent by the dissemination system to a list of customers. For example, data regarding the location of a communicator located in a rail car might be sent not only to the operator of the railroad but also to customers of the railroad with goods being transported on that rail car. Alternatively data may be sent by the dissemination system to a prioritized list of customers, whereby if the first customer on the list acknowledges receipt of the data, the data is not sent to any further customers on the list, but if the first customer on the list fails to acknowledge the message, the dissemination system sends the message to the second customer on the list, and so forth. This latter mode of data dissemination helps to provide guaranteed delivery without introducing the possibility of wasted effort by multiple parallel customer responses to the message.

Storage module 250 serves to store data received from sensors after processing by the message and command handler. In a first preferred embodiment, the storage module is located on processor 212 and memory 214, but may include a dedicated processor and a dedicated memory in other embodiments. The storage module preferably stores all data received from communicators 100, but may store only selected data or summaries thereof depending on the volume of data, customer needs, and hardware capabilities. The storage module preferably uses a commercial off-the-shelf relational database to store the data, but other storage methods (such as proprietary databases, commercial off-the-shelf object-oriented databases, and flat files) are also possible.

Applications module 260 provides front office and back office functionality, typically including billing, accounting, and technical support functionality, and may consist of more than one separate module in some embodiments. The applications module may be located on one or more dedicated processors in certain embodiments and may be divided internally into several applications (such as billing, accounting, and technical support). In some embodiments, commercial off-the-shelf front and back office components may be used, such as the Platinum ERA product available from the Epicor company of Irvine, Calif., or similar products available from Oracle and SAP.

In most embodiments, customer billings will be related to (1) the number of messages sent to or from a remote site, (2) the amount of time used in transmitting the customer's data, or (3) the amount of data transmitted. The time of day at which each transmission occurs and the relative availability of bandwidth may also be factors, as well as the usage of resources in processing the data and in making it available to the customer. In the simplest case, the customer's bill is determined by applying a function to the total number of all transmissions by the customer's communicators, where the function consists of either multiplying such number of messages by a single factor, or applying a sliding scale of factors to such number of messages. Whichever method is used, the message and command handler will extract the data required to compute the customer's bill (typically the number of messages or the length of each transmission or the amount of data transmitted in each transmission) and send it to the applications module for use by the billing application.

In certain embodiments, each customer's bill may be made available to the customer through the dissemination system after calculation thereof by the billing application for delivery by any method available to the customer for delivery of sensor data. In other embodiments, the data necessary to prepare the bill may be forwarded to an external system.

Applications such as the accounting and customer support applications will also draw data from the message and command handler and the other applications. For example, the accounting application would typically extract the amount of each bill from the billing application and the usage of a particular transport subsystem from the message and command handler. The technical support application would typically allow a technical support representative to draw data from any other portion of the network operating center to help resolve any questions or problems of the customer.

Embodiments adapted for use for particular purposes may vary from the embodiments described above with respect to FIGS. 1 through 3. For example, an embodiment designed for use in locating breaks in power lines might not utilize a sensor (and might have no ports at which to attach sensors, etc.), might be powered by stray power collected from the power line to which the communicator is attached (collected by a clamp), and might use an internal power source only for the purpose of transmitting a message to the network operating center to indicate that its power source had been interrupted (and hence that the power line was broken).

An embodiment designed for use in utility metering might have quite limited communication requirements but be constrained more than other embodiments by cost limitations. The utility metering communicator might need to connect to only one type of sensor (a meter reader) and might not need as many alternatives for communicating with the network operations center. Eliminating such capabilities and using less expensive components, such as less powerful microprocessors, might be necessary to make such an embodiment viable economically.

Similarly, a communicator designed to be used only for determining the current location of a resource might not need to communicate with sensors or to perform much processing because all needed data could be drawn from a GPS receiver. Hence eliminating all or part of the sensor interface might be advisable to limit cost.

Figure 4:
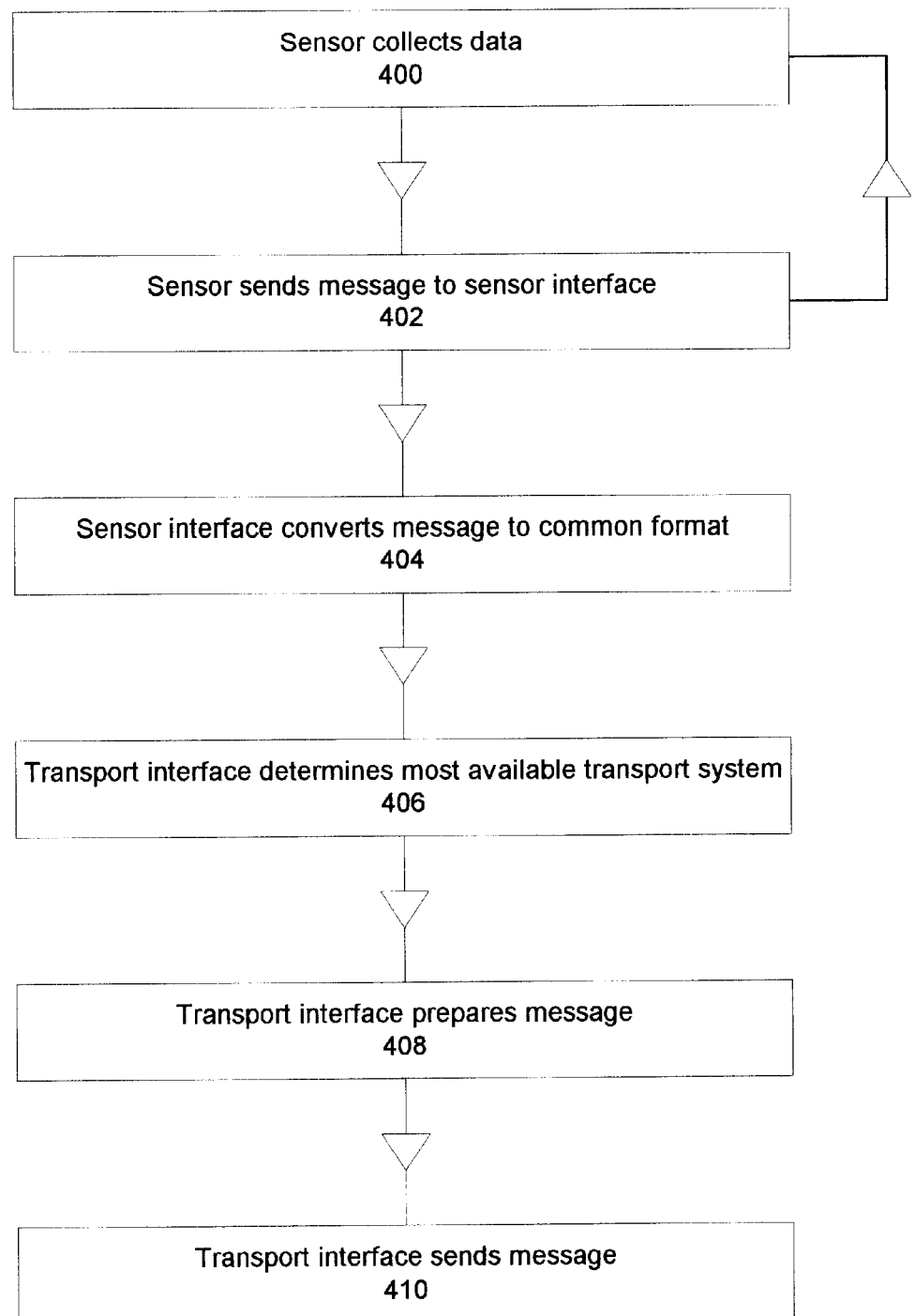
FIG. 4 is a flow diagram illustrating a method of transmitting data from a remote sensor to a central location in accordance with a first preferred embodiment of the present invention.

Referring to FIG. 4, in step 400, a method of transmitting data from a remote sensor to a central location is illustrated. In step 400, a remote sensor collects data, which, as discussed above, may be temperature or humidity readings or any other type of data that can be read by a machine. In general, the sensor is a separate device that is attached to a communicator. In step 402, the sensor periodically sends messages on a predetermined schedule to the attached communicator through one of several ports 128, 130, or 132 and may draw power from the communicator through connection 146. In some applications, however, the sensor may be integrated into the communicator. In such cases, steps 402 and 404 are omitted. Furthermore, in some applications a sensor is unnecessary. For example, in a vehicle tracking system, a GPS receiver may be able to provide all of the data that is necessary, namely the vehicle's location and the current time. In such a system, steps 400 through 404 are omitted. In any event, the sensor continues to measure data in accordance with its predetermined measurement schedule.

In step 404, the sensor interface converts the message received from the attached sensor to a common format. The sensor interface, of course, will only be able to recognize predetermined formats coded into the sensor interface (or made available to the executable file through an external resource, such as a database). Typically, the sensor interface would be able to recognize at least one variety of each of digital, analog, and computer data formats. As discussed above, the degree to which the underlying sensor readings are converted depends on the particular sensor being used. In some cases, the underlying sensor readings will be transmitted as raw digital or raw analog data to the network operating center. The sensor readings may then be deciphered at the network operating center by such means as consulting a stored table in which sensor types are associated with specific communicators. Alternatively, the sensor readings may be transmitted as raw (possibly encrypted) data to the customer, particularly in cases in which secrecy is essential to the customer.

In step 406, the transport system determines the most available transport subsystem. Typically, a transport system will include several transport subsystems, such as cellular, paging, and satellite systems. Individual communicators, particularly those currently (or always) located in remote areas may have only one such transport subsystem available to them. Other communicators have a choice of available transport subsystems to use and select the most available transport subsystem.

The transport interface can determine the most available transport subsystem in any of a variety of ways. The communicator can have certain historical data stored in it, such as the cost of using each transport subsystem, geographical regions in which a type of service such as cellular service is unavailable, and measures of signal quality of past transmissions. The communicator may also send test messages using one or more of the transport subsystems to determine which is most available. Conversely, a network operations center may periodically transmit data to each communicator indicating which transport subsystem is most available at the time. Alternatively, step 406 may be merged into steps 408 and 410 and the communicator may attempt to send a message on a preferred transport subsystem one or more times, or the transport subsystem expected to be most available based on historical data, and if the message is unsuccessful, try to send the same message (reformatted if necessary) using a different transport subsystem one or more times, and so forth, until the message is successfully sent or all of the transport subsystems have been determined to be unavailable.

In step 408, the transport interface prepares the data for transmission. This includes formatting the data in a manner appropriate for the particular transport subsystem that will be utilized, as selected in step 406. Other required preparation may include encoding the data to protect a customer's confidential data, bit stuffing the data to reduce the size of transmissions, error correction steps to allow detection of data corruption, the transmission of certain overhead messages, such as acknowledgement and non-acknowledgement messages, and the execution of failure recovery processes to ensure message delivery despite hardware or software failures. Depending on the transport subsystem and hardware used to transmit a particular message, the preparations may also include carrier monitoring, frequency offsetting, Doppler corrections, power adjustments, and synchronization.

In step 410, the transport interface transmits a message containing the data using the selected transport subsystem to the central location.

Figure 5:
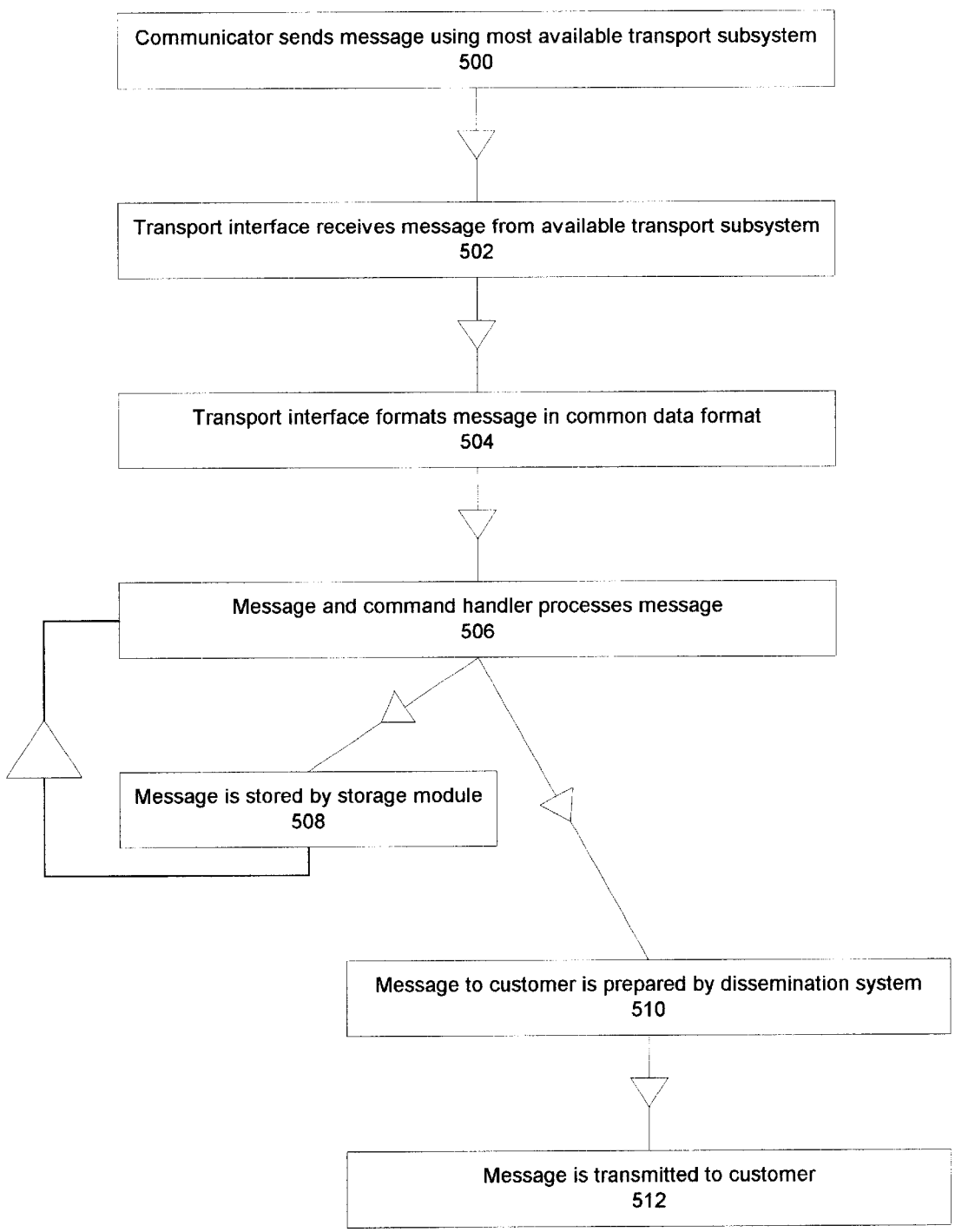
FIG. 5 is a flow diagram illustrating a method of receiving data from a remote sensor at a central location in accordance with a first preferred embodiment of the present invention.

Referring to FIG. 5, a method of receiving data from a remote sensor at a central location is illustrated. In step 500, a communicator sends a message using the most available transport subsystem, as discussed above with respect to figure 4. In step 502, the transport interface of a network operations center receives the message from the applicable transport subsystem. In certain embodiments, the transport interface may incorporate antennae, transceivers, and other telecommunications components so as to allow it to receive wireless transmissions directly. In the preferred embodiments, however, the transport interface receives each message as an electronic message (such as an e-mail message) transmitted by the transport subsystem provider over the Internet or other network or telephonic connection.

In step 504, the transport interface of the network operations center extracts the contents of the message and converts them into a common format. In the preferred embodiments, this step entails stripping away header and similar data inserted by the transport subsystem provider and adding header data conforming with the common data format. If the underlying data is not yet in the common data format, such data may need to be reformatted as well.

In step 506, the formatted message is sent to the message and command handler, which processes the message. The message and command handler applies predetermined criteria to determine whether to store the message and whether to send a message to the applicable customer. For example, in the case of a series of temperature readings, the criteria might consist of storing all readings and notifying the customer of all readings falling outside of a predetermined temperature range. The message sent to the customer need not relate solely to the message received from the communicator. For example, the criteria could specify also sending an additional message containing an average temperature reading with respect to a series of sensors if the message received is the last of all expected messages from the set of sensors in a particular time period.

The message and command handler may also extract data from the received message and send such data to other portions of the network operations center for further processing. For example, the message and command handler could extract the number of bits received from each message and forward this number to the billing system to aid in determining a customer's bill.

In step 508, if the message and command handler has determined that a message should be stored, the message is stored in memory by the storage module. In step 510, if the message and command handler has determined that a message should be sent to the customer, a message is prepared by the dissemination system in a format appropriate to the mode in which the message is to be transmitted to the customer (over the Internet, by automated voice message, by hard copy, etc.). With respect to each message, either, both, or neither of steps 508 and 510 can take place, depending on determinations made by the message and command handler in step 506. Finally, in step 512, the message is sent to the customer through the appropriate communications medium (providing that the message and command handler has determined that a message should be sent to the customer).

Figure 6:
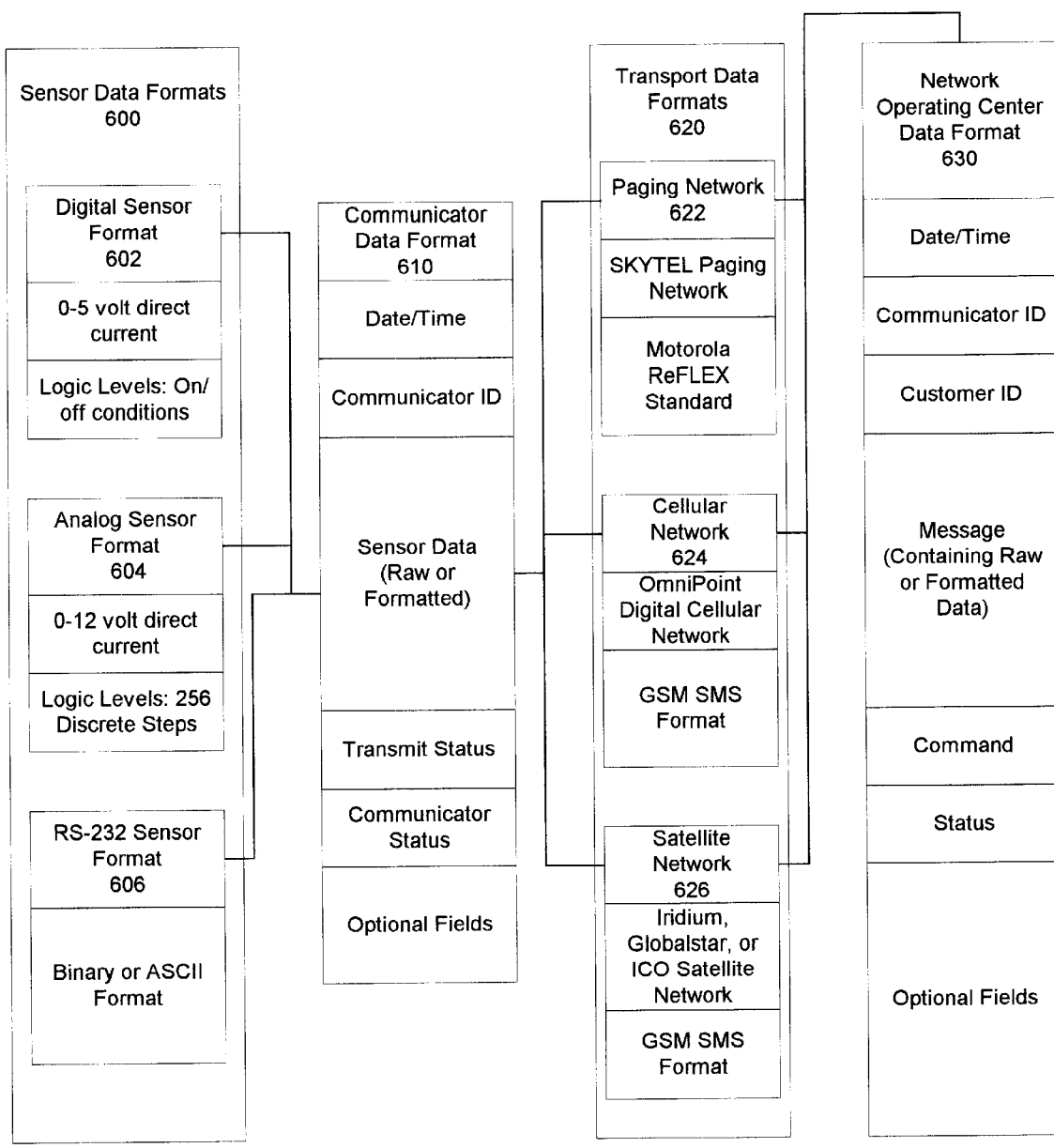
FIG. 6 illustrates several data formats that may be applied to data generated by sensors in accordance with a first preferred embodiment of the present invention.

Referring to FIG. 6, the data formats used in the preferred embodiment of the present invention are summarized. For purposes of simplicity, the possibility that data may be encrypted at certain stages is ignored. Data transmitted from a sensor to a connected communicator is transmitted in one of several sensor formats 600. In a first preferred embodiment, the sensor format used will ordinarily be one of digital 602, analog 604, or RS-232 606. Digital format 602 would typically be implemented with a zero to five volt direct current circuit and would provide two logic levels, on and off (or alternately open and closed or full and empty). Analog format 604 would typically be implemented with a zero to twelve volt direct current circuit and would provide a series of 256, 512, 1024, or another convenient number of steps of value. Thus, analog input would be discrete rather than continuous in nature. The use of 256 steps is particularly convenient because that is the number of states that can be represented by one byte of memory. RS-232 format 606 is a commonly accepted serial port communications format. Either binary data or ASCII formatted data can be conveniently accepted using the RS-232 protocol. ASCII format is particularly convenient in that dissemination system 240 can prepare human readable reports from ASCII formatted data without the need to know what such data represents (provided that the data itself contains all necessary labels and other elements). Binary data has the advantage of allowing more data to be packed into the same amount of message space, thereby permitting reduced usage of communications resources.

Whichever sensor format is used, the data transmitted by the sensor to the communicator is reformatted by sensor interface software 126 into communicator data format 610. In a first preferred embodiment, communicator data format contains at least five fields: a date and time stamp, a communicator identification code, the sensor data, the transmit status, and the communicator status. The date and time stamp (which may be subdivided into two fields, one for the date and one for the time) stores the time and date at which the sensor conducted the underlying measurements. The date and time stamp may be stored as ASCII data or in a binary format, such as any format used by a spreadsheet or database. The communicator identification code should uniquely identify the communicator, not merely vis-à-vis communicators pertaining to the instant customer, but also vis-à-vis communicators pertaining to different customers.

The sensor data if received through analog or digital ports is converted into ASCII or binary form. Depending on predetermined parameters established by the customer, further formatting may or may not be applied to ASCII or binary data. For example, temperature readings may have symbols indicating that the values represent degrees Celsius appended to them. The data may also be encrypted at this, an earlier, or a later stage. In the preferred embodiments, the divisions between data fields within a message are demarcated so as to allow subsequent parsing by one of three methods: (1) separator characters (such as null characters) between data fields, (2) fixed length fields, or (3) header data (which may include the length of the sensor data field inserted at the beginning of the sensor data field). The particular method used depends on each customer's specific requirements.

The transmit status and communicator status fields store status information relating to the communicator and the transmission of the instant message. These fields may be formatted in ASCII form, but would ordinarily be formatted in binary form, with each field possessing one of a number of predetermined enumerated values. Other fields may optionally be included as well.

Transport interface 110 formats the message for delivery by a transport subsystem to the network operating center. If the message is to be transported by a cellular network, such as the OmniPoint Digital Cellular Network, or a satellite network, such as any of the Iridium, Globalstar, or ICO satellite networks, the message is formatted in accordance with the Short Message Service standard (as defined under the Global System for Mobile Communications) in a first preferred embodiment. If the message is to be transported by a paging network, such as the SKYTEL Paging Network, the message is formatted in accordance with the Motorola ReFLEX standard in a first preferred embodiment. Of course, other message formats may be used in other embodiments of the present invention.

After receipt of the message by the network operating center, network operating center transport interface 220 reformats the message in accordance with a network operating center data format 630. Several of the fields are analogous to those in communicator data format 610, namely the date/time field, the communicator identification code field, and the message field (which corresponds to the sensor data field in the communicator data format). A customer identification code field is added to allow efficient access to the identity of the customer to whom a communicator belongs. Command and status fields relate to the status of the message as it is processed within the network operations center. Additional optional fields may be present as well.

The present invention may be embodied in other specific forms without departing from the spirit or essential attributes of the invention. Accordingly, reference should be made to the appended claims, rather than the foregoing specification, as indicating the scope of the invention.

What is claimed is:

1. A data acquisition system, comprising:

a network operations center, said network operations center having a transport interface, a dissemination system, a message and command handler, and a message storage module, wherein said message and command handler is connected to said transport interface and to said dissemination system, wherein said message storage module is connected to said message and command handler, wherein said transport interface receives data from a transport system in one of a plurality of predetermined data formats, wherein said transport interface converts the data into a common format if the data is not already in the common format, and wherein said message and command handler receives the formatted data from said transport interface;

a communicator, said communicator comprising a processor, a sensor interface, and a transport interface, said sensor interface connected to said processor, said sensor interface connected to said processor, said transport interface connected to said sensor interface and said processor, wherein said sensor interface receives data from a sensor in accordance with a data monitoring instruction, said data in a first format, said sensor interface converts the data into a common format if the data is not already in the common format, and said transport interface receives the formatted data from said sensor interface and transmits the data to a transport system, wherein said data monitoring instruction identifies at least one monitoring parameter, said monitoring parameter selected from a group of monitoring parameters comprising a monitoring frequency, a reporting threshold, and a reporting frequency;

wherein the transport system comprises at least two communications paths chosen from a list of communications paths consisting of a cellular transmission path, a satellite cellular transmission path, a publicly switched telephone network, and a pager network;

wherein said dissemination system communicates revised data monitoring instructions from a data customer to said message and command handler, and said message and message handler transmits the revised data monitoring instructions to the communicator via the transport system;

wherein said dissemination system receives the formatted data from said message and command handler and transmits the formatted data to at least one customer in a prioritized list of customers; and wherein the at least one customer is selected by progressively transmitting the formatted data to the customer with the highest priority on the prioritized list to whom the formatted data has not yet been transmitted until an acknowledgement is received by the network operations center that at least one customer on the prioritized list has received the formatted data.

* * * * *